United States Patent
Smets et al.

(10) Patent No.: US 7,657,486 B2
(45) Date of Patent: Feb. 2, 2010

(54) TECHNIQUES FOR CO-EXISTENCE OF MULTIPLE STORED VALUE APPLICATIONS ON A SINGLE PAYMENT DEVICE MANAGING A SHARED BALANCE

(75) Inventors: Patrik Smets, Nijlen (BE); Mike Cowen, London (GB)

(73) Assignee: Mastercard International Incorporated, Purchase, NY (US)

( * ) Notice: Subject to any disclaimer, the term of this patent is extended or adjusted under 35 U.S.C. 154(b) by 131 days.

(21) Appl. No.: 11/604,998

(22) Filed: Nov. 28, 2006

(65) Prior Publication Data

US 2007/0131761 A1 Jun. 14, 2007

Related U.S. Application Data

(60) Provisional application No. 60/748,796, filed on Dec. 9, 2005.

(51) Int. Cl.
 *G06Q 40/00* (2006.01)
(52) U.S. Cl. .......................................... 705/41; 705/39
(58) Field of Classification Search .............. 705/1, 705/41, 80, 51, 65, 39, 14, 43, 36, 405, 44; 235/380, 379, 441, 487; 707/2, 200, 4
See application file for complete search history.

(56) References Cited

U.S. PATENT DOCUMENTS

| | | | |
|---|---|---|---|
| 6,018,717 A * | 1/2000 | Lee et al. ....................... 705/13 |
| 6,085,976 A | 7/2000 | Sehr |
| 6,256,690 B1 | 7/2001 | Carper |
| 6,641,050 B2 | 11/2003 | Kelley et al. |
| 2001/0044321 A1 | 11/2001 | Ausems et al. |
| 2002/0002534 A1 | 1/2002 | Davis et al. |
| 2002/0091562 A1 | 7/2002 | Siegel et al. |
| 2004/0238620 A1* | 12/2004 | Cohagan et al. ............. 235/380 |
| 2005/0116026 A1* | 6/2005 | Burger et al. ............... 235/380 |
| 2005/0236491 A1 | 10/2005 | Leaming |

FOREIGN PATENT DOCUMENTS

EP     0 945 833 A2     9/1999

OTHER PUBLICATIONS

The Globe and Mail (Canada), Articlle: "Card does quick checks for teller machine" By: Karen Howlett; Nov. 4, 1985.*

* cited by examiner

*Primary Examiner*—James P Trammell
*Assistant Examiner*—John H Holly
(74) *Attorney, Agent, or Firm*—Ryan, Mason, Lewis, LLP; Leonardo Renna; Paul J. Otterstedt

(57) ABSTRACT

A method of managing a first stored value application having a first application balance and a second stored value application having a second application balance, can include the steps of facilitating conducting of a first transaction by the first stored value application, and synchronizing the second stored value application with the first stored value application. The synchronization can be substantially contemporaneous with the transaction. The applications can reside on the same portable payment device.

21 Claims, 7 Drawing Sheets

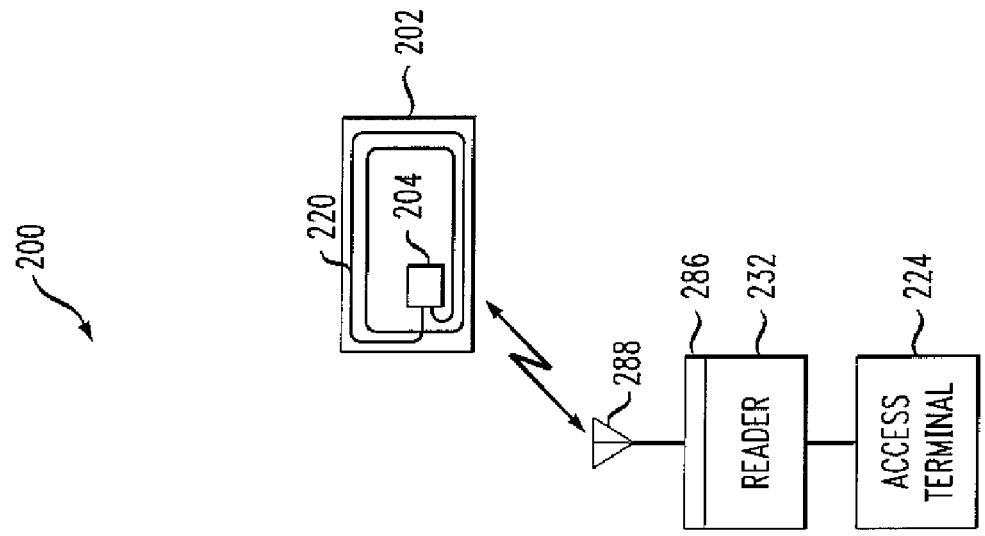
*FIG. 2*
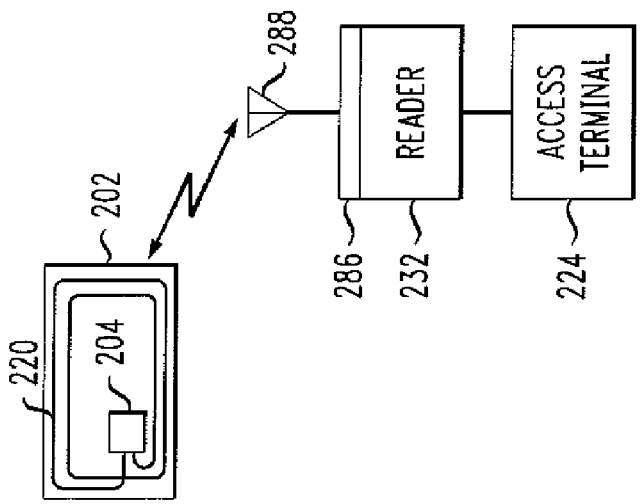

NEW APPLICATION ACTIVATION

NEW APPLICATION ACTIVATION

TECHNIQUES FOR CO-EXISTENCE OF MULTIPLE STORED VALUE APPLICATIONS ON A SINGLE PAYMENT DEVICE MANAGING A SHARED BALANCE

CROSS-REFERENCE TO RELATED APPLICATIONS

This patent application claims the benefit of U.S. Provisional Patent Application Ser. No. 60/748,796 filed on Dec. 9, 2005, and entitled "Techniques for Co-Existence of Multiple Stored Value Applications on a Single Payment Device Managing a Shared Balance." The disclosure of the aforementioned Provisional Patent Application Ser. No. 60/748,796, including the complete appendix thereof, is expressly incorporated herein by reference in its entirety.

FIELD OF THE INVENTION

The present invention relates generally to electronic payment devices, and, more particularly, to such devices having stored value capability.

BACKGROUND OF THE INVENTION

Cards and other devices for performing financial transactions may have stored values in the form of a balance. Such a balance may be available for so-called offline spending. In the case of a high value purchase, a credit or debit card, or other payment device, may go online to communicate with a host computer of a card issuer to ensure, for example, that sufficient funds are available for a transaction, that the card or other payment device has not been reported as lost or stolen, and so on. However, it may not be convenient to go online, due to time constraints, or lack of access to a computer network.

US Patent Application Publication 2002/0002534 of Davis et al. discloses a Method and System for Managing Transactions. The system can be configured for facilitating offline payment transactions. US Patent Application Publication 2005/0236491 of Leaming discloses a Smart Card Providing Data Mapping for Multiple Applications and Related Methods. U.S. Pat. No. 6,256,690 of Carper discloses a system and Method for Facilitating Multiple Applications on a Smart Card. One application may call another application, or leave a message for it.

US Patent Application Publication 2002/0091562 of Siegel et al. is directed to Facilitating Offline and Online Sales. A customer maintains an Electronic Information Account (EIA) on a data storage device, such as on a portable electronic device (e.g., personal digital assistant) or on a nonvolatile memory device (e.g., smart card, memory stick). On the storage device, the EIA includes a customer profile and transaction records for later reference and for selective electronic communication to merchants and sources of goods or services for purposes of speeding a transaction, suggesting future purchases based on prior transactions, confirming product warranty registration, and limiting transactions for subordinate customers. Comprehensive capturing of transaction records is provided by synchronizing the data stored on the customer data storage device and on a remotely stored duplicate customer profile and database of transaction records.

European Patent Application EP 0 945 833 A2 of Kawan discloses a Method and System for Remote banking with a Multi-Memory Technology Smart Card. Use is made of a smart card having a transactional type memory, such as an integrated circuit chip module memory, for example, for daily merchant type transactions, and a historical type memory, such as an optical stripe memory to store more voluminous information, such as account records, medical and personal information for a customer. For daily transactions, data representing, for example, monetary value is stored in the transactional memory and used for merchant transactions, and the merchant transactions are recorded in the transactional memory. From time to time, the merchant transaction records are transferred to the historical memory. Likewise, data representing monetary value can be stored in the historical memory, and from time to time, such data can be transferred to the transactional memory.

When it is not possible or desirable to go online, the aforementioned stored value in the form of a balance may be desirable. A transaction can proceed without establishing communications with an online host. This can be advantageous for low value transactions, transactions where access to a computer network is not available, or transactions where time is of the essence, for example, entrance and/or exit to and from a transportation system such as a subway, underground, or metro. It should be noted that stored balances are not limited to offline-only applications.

There may be more than one type of stored balance system in use in a given environment, or there may be currently only a single system, but it may be desirable to introduce a new system. Carrying of multiple payment devices for multiple systems may be inconvenient, and compatibility between multiple systems may be desirable.

Accordingly, a need exists for a way to manage multiple stored value applications in a convenient and efficient manner.

SUMMARY OF THE INVENTION

Principles of the present invention provide techniques for managing multiple stored value applications on cards or other payment devices. The applications and balances can be, e.g., offline balances, but the invention is not limited to offline applications and balances. An exemplary embodiment of a method (which can be computer-implemented), according to one aspect of the invention, includes the steps of facilitating conducting a first transaction (e.g., a purchase or load of value) by the first stored value application; and synchronizing a second stored value application with the first stored value application. The synchronization can be substantially contemporaneous with the first transaction.

In one specific exemplary approach, an additional step of facilitating conducting a second transaction by the second stored value application can be included, and the second transaction can be conducted substantially without contemporaneous synchronization between the first and second stored value applications. Again, in one specific exemplary approach, the synchronizing step includes setting the first application balance equal to the second application balance prior to the first transaction, in case the second application balance has been reduced due to a transaction conducted by the second application. In such approach, the synchronizing step further includes setting the second application balance equal to the first application balance, subsequent to the first transaction. This can be done to reflect, in the second application balance, a reduction in the first application balance caused by conducting the first transaction by the first application.

An exemplary embodiment of a payment device (such as a card or appropriately configured cellular phone), according to another aspect of the invention, can include a body portion, a memory associated with the body portion, and at least one processor associated with the body portion and coupled to the memory. The processor can be operative to perform one or more of the method steps described herein. The applications can reside in the memory. Further, an exemplary embodiment of terminal apparatus for interacting with a payment device of the kind described, according to still another aspect of the invention, can include a reader module, a memory associated with the reader module, and at least one processor coupled to the memory. The processor can be operative to perform one or more of the method steps described herein. One or more method steps of the present invention can be implemented in the form of an article of manufacture comprising a machine readable medium that contains one or more programs which when executed implement such step(s).

Techniques of the present invention can provide substantial beneficial technical effects. These can include, for example, accommodating different transaction timing requirements such as a relatively short time for access to a transportation system by a legacy application and a relatively long time for relatively more secure transactions by a newer application. Further, techniques of the present invention allow secure data separation between legacy and new applications, while presenting the user with a transparent experience and a single balance to manage. Yet further, techniques of the present invention can be implemented with minimal impact on legacy infrastructure and new infrastructure.

These and other features and advantages of the present invention will become apparent from the following detailed description of illustrative embodiments thereof, which is to be read in connection with the accompanying drawings.

BRIEF DESCRIPTION OF THE DRAWING

FIG. 2 shows one specific exemplary application of techniques of the present invention to a transportation system;

DETAILED DESCRIPTION OF THE PREFERRED EMBODIMENTS

Figure 1:
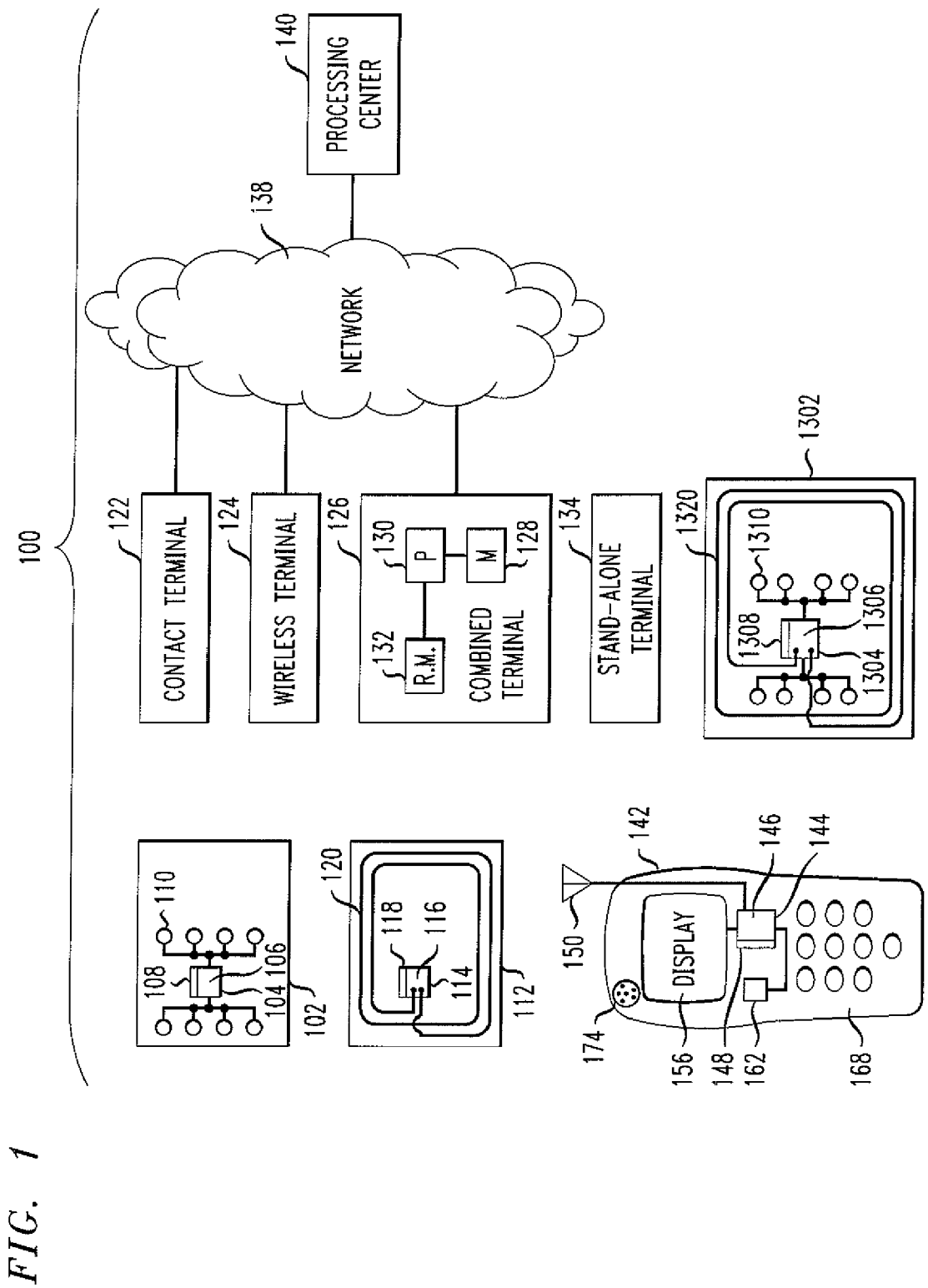
FIG. 1 shows an example of a system that can implement techniques of the present invention.

Attention should now be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. In one preferred embodiment of the invention, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112. The description of devices, elements, or components 102, 104, 106, 108, 110, 112, 114, 116, 118, 120 throughout this document are equally applicable to the corresponding items 1302, 1304, 1306, 1308, 1310, 1320.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN"). The memory portions or units 108, 118 can store the operating system of the cards 102, 112. The operating system loads and executes applications and provides file management or other basic card services to the applications. In some embodiments, one or more applications may "sit" directly on hardware, e.g., may be outside the domain of the operating system. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications as described herein. At present, one preferred standard to which such applications may conform is the EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in such a sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets, or access cards for a public transportation system, that implement techniques of the present invention. Such devices could include cards having a conventional form factor, smaller or larger cards, cards of different shape, key fobs, personal digital assistants (PDAs), appropriately configured cell phone handsets, or indeed any device with the processing and memory capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain applications as described herein. The processors 106, 116 can be operative to execute one or more method steps to be described herein. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, or a combined terminal 126. Combined terminal 126 is designed to interface with either type of device 102, 112. Most typically, terminals are contact terminals with plug-in contactless readers. Combined terminal 126 can include a memory 128, a processor portion 130, and a reader module 132. Note that the principles of construction of terminal 126 are applicable to other types of terminals and are described in detail for illustrative purposes. Reader module 132 can be configured for contact communication with card or device 102, or contactless communication with card or device 112, or both (different types of readers can be provided to interact with different types of cards e.g., contacted or contactless). Terminals 122, 124, 126 can be connected to a processing center 140 via a computer network 138. Network 138 could include, for example, the Internet, or a proprietary network. Processing center 140 can include, for example, a host computer of an issuer of a payment device.

Stand-alone terminal 134 is representative of a terminal that is not connected to a computer network (either not connected at a particular time, or not connected at all, by design), and is otherwise generally similar to the other terminals described.

An appropriately configured cellular telephone handset 142 can also be employed in system 100. Handset 142 is depicted in semi-schematic form in FIG. 1, and can include one or more IC chips such as chip 144 including a processing unit 146 and a memory unit 148. Wireless communication with a terminal can be provided via antenna 150. Handset 142 can each be equipped with a suitable display 156. Further, an appropriate power supply 162 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1.

In one aspect of the present invention, a portable payment device is provided for facilitating transactions by a user with a terminal, such as 122, 124, 126, 134, of a system such as system 100. The device can include a processor, for example, the processing units 106, 116, 146 discussed above. The device can also include a memory, such as memory portions 108, 118, 148 discussed above, that is coupled to the processor. Further, the device can include a communications module that is coupled to the processor and configured to interface with a terminal such as one of the terminals 122, 124, 126, 134. The communications module can include, for example, the contacts 110 or antennas 120, 150, together with appropriate circuitry (such as the aforementioned oscillator or oscillators and related circuitry) that permits interfacing with the terminals via contact or wireless communication. The processor of the apparatus can be operable to perform one or more steps of methods and techniques described herein. The processor can perform such operations via hardware techniques, and/or under the influence of program instructions stored in one of the memory units; in one exemplary preferred embodiment, via the instructions in the first and second payment applications described herein.

The portable device can include a body portion. For example, this could be a laminated plastic body (as discussed above) in the case of "smart" cards 102, 112, or the handset chassis and body in the case of handset 142. The device can be limited to the stored value application(s), but can also include a payment application without an on-device balance, such as a debit and/or credit card. One approach to providing such an arrangement would be to have additional applications running on processor portions 106, 116 and stored in memory portions 108, 118. For example, these could include a conventional credit or debit application in addition to the payment applications with on-device balances. Conventional magnetic stripes could be included on cards 102, 112 for conventional purposes, and for the convenience of having such stripes collocated with the other features described herein.

It will be appreciated that the terminals 122, 124, 126, 134 are examples of terminal apparatuses for interacting with portable payment devices in accordance with one or more exemplary embodiments of the present invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138.

The above-described devices 102, 112 are preferably ISO 7816-compliant contact cards or devices or ISO 14443-compliant proximity cards or devices. In operation, card 112 can be touched or tapped on the terminal 124 or 128, which then contactlessly transmits the electronic data to the proximity IC chip in the card 112 or other wireless device. Further details regarding standards are set forth hereinbelow.

Attention should now be given to FIG. 2, which depicts a system 200 employing certain techniques of the present invention applied to an exemplary transportation system 280. It is to be understood that this is illustrative of one of many possible applications of techniques of the present invention. Passenger access to system 200 is controlled by portable payment devices 202 and terminals 224. Elements in FIG. 2 similar to those in FIG. 1 have received the same reference character incremented by 100 and will not be described in detail again. Thus, devices 202, chips 204, antennas 220, terminals 224 and reader modules 232 are similar to those discussed above with respect to FIG. 1. The reader modules can include communications circuitry 286 and antennas 288 for wireless communications with antennas 220. Contact solutions could also be employed, in addition to or in lieu of contactless solutions.

When a passenger wishes to enter system 280, he or she causes device 202 to communicate with access terminal 224 (for example by touching or tapping at a designated location, or holding in close proximity to such location), which may reduce a balance of a payment application on device 202. A turnstile or other entrance barrier may then permit passage through entrance 282 to trains or other modes of transportation. In some cases, a passenger must again present device 202 when exiting at exit 284, as a fare may depend on a distance traveled. Further, in some cases, an excess amount is deducted at entrance 282 and is partially refunded at exit 284 to discourage "skipping out" without re-presenting device 202 at the access terminal 224 associated with exit 284.

Figure 3:
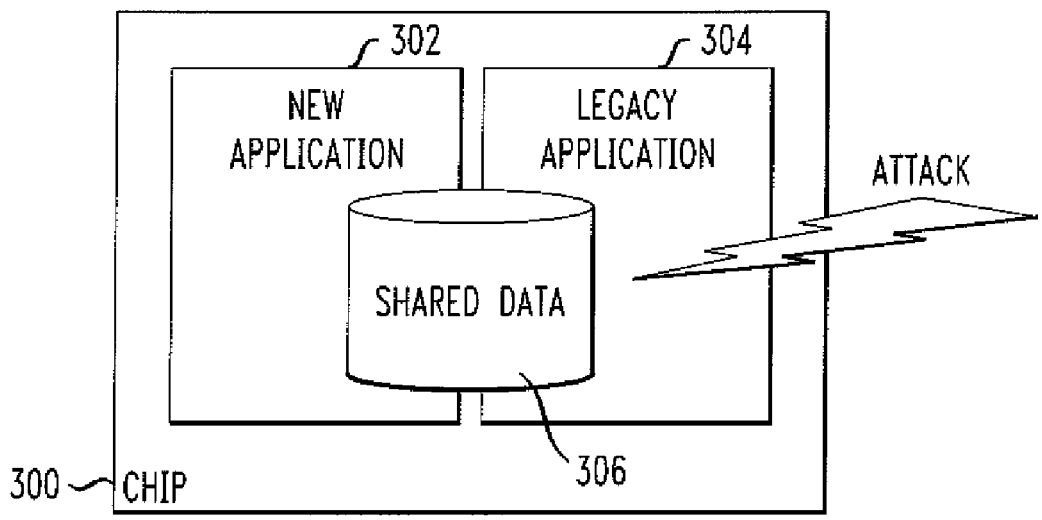
FIG. 3 shows a potential attack on shared data in a system where first and second stored value applications share common data.

FIG. 3 shows a "smart" card chip 300 having a first application, for example, a relatively new, relatively high-security application 302, and also having a second application. The second application could be, for example, a relatively less secure legacy application 304. If shared data 306 is employed, because legacy application 304 will typically have weaker security algorithms and smaller cryptographic keys than new application 302, an attack on the legacy application could compromise security of the new application 302.

Figure 4:
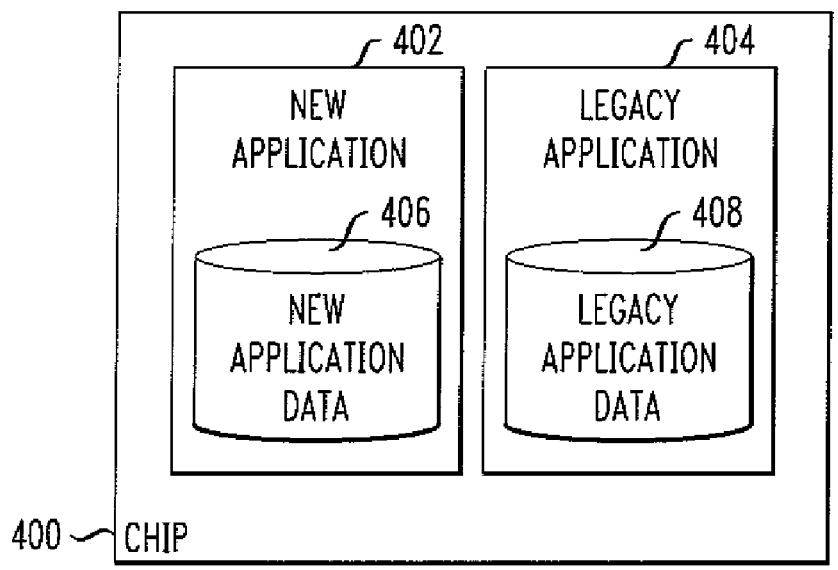
FIG. 4 shows a preferred exemplary implementation of techniques of the present invention, wherein data for first and second stored value applications is kept separate.

FIG. 4 shows one preferred implementation of techniques of the present invention. To prevent attacks as shown in FIG. 3, the new application 402 and legacy application 404 on chip 400 have separated data, namely, data for the new application, designated as "new appl. data" 406, and "legacy appl. data" 408 for the legacy application. It is to be understood that in this context, "new" application data means data associated with new application 402. Further, it is to be understood that "new" and "legacy" applications are merely exemplary; techniques of the present invention can be used with any two (or more) applications having balances.

It is to be understood that desirably, the user of a card or other payment device is simply aware of a single balance, despite the fact that two (or more) payment applications are present on the device. To accomplish this, the different applications should synchronize. This should preferably be accomplished in a way that respects different security levels, different transaction time requirements, and other possible differences between the applications. Further, it is desirable that there be no impact on legacy terminals and other infrastructure. In one exemplary form of the present invention, synchronization is handled on the card or other portable payment device without requiring any change to transaction flow at legacy or new terminals. However, it should be understood that one or more method steps depicted herein could be carried out under terminal control, or a combination of on-device and terminal control could be used.

Figure 5:
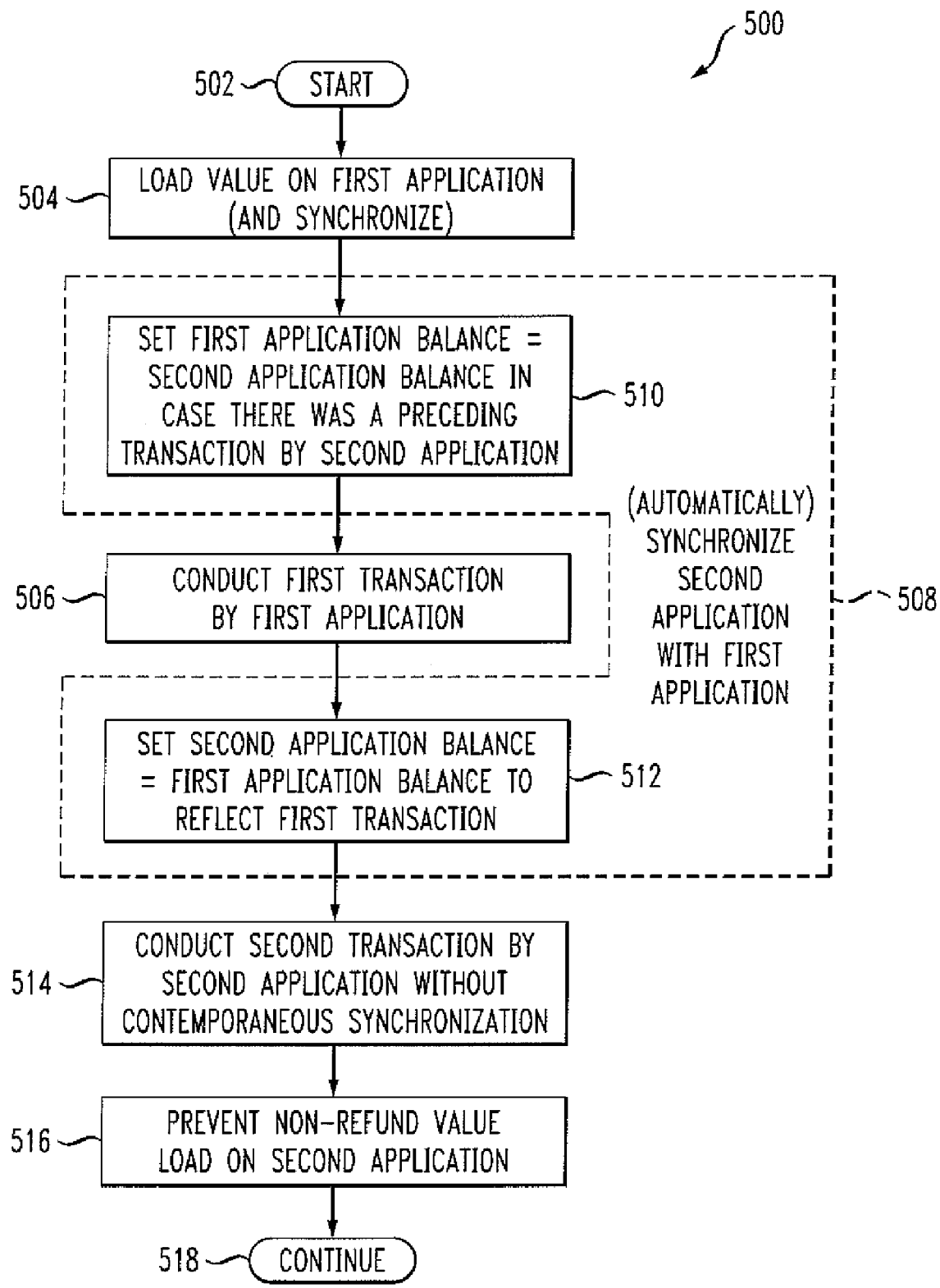
FIG. 5 is a flow chart of an exemplary method according to an aspect of the present invention.

Attention should now be given to FIG. 5, which shows a flow chart 500 of exemplary method steps in a method, which can be computer-implemented, of managing a first stored value application having a first application balance and a second stored value application having a second application balance. It is to be emphasized that sequences and steps other than those shown in FIG. 5 are also within the scope of the present invention. After beginning at block 502, the method can optionally include a step 504 of facilitating loading of value on the first stored value application to increase the first application balance. It should be understood that loading is just one form of transaction, as is spending, and so step 504 is in essence a particular case of a general transaction step 506, and can be accompanied by a contemporaneous synchronization as described with regard to steps 506 and 508. As used herein, "facilitating" an action includes performing the action, making the action easier, helping to carry the action out, or causing the action to be performed. Step 506 includes facilitating conducting of a first transaction by the first stored value application. Step 508 includes synchronizing the second stored value application with the first stored value application. Such synchronizing is preferably substantially contemporaneous with the transaction (i.e., at the same time, just before, or just after, and can include multiple sub-steps at any of the indicated times, such as both before and after, as discussed with regard to steps 510 and 512). In one or more embodiments of the invention, the synchronizing step can be conducted automatically in association with step 506.

As shown at step 514, a step of facilitating conducting of a second transaction by the second stored value application can be performed. The second transaction can be conducted substantially without contemporaneous synchronization between the first and second stored value applications. Stated in a different way, synchronization can be constrained to cases when the first (e.g., newer, higher security) application conducts a transaction, and can be refrained from when the second (e.g., legacy, lower security) application conducts a transaction. Such a scheme could also be advantageous where the second application has a more strict transaction time requirement, and the transaction time should not be burdened with synchronization in addition to the transaction.

In one or more forms of the invention, the synchronizing step 508 can in turn include a step 510, executed prior to the first transaction, of setting the first application balance equal to the second application balance. This accounts for the case when the second application balance has been reduced due to a preceding transaction conducted by the second application. Step 508 can further include a step 512, executed subsequent to the first transaction, of setting the second application balance equal to the first application balance. This can be done in order to reflect in the second application balance a reduction in the first application balance (or increase in the case of a load) caused by the conducting of the first transaction by the first application. Of course, during the transaction by the first application in step 506, the first application balance is itself increased or decreased to accurately reflect the available "open to spend" balance.

In step 510, setting of the first application balance equal to the second application balance can be accomplished by the first application accessing a memory space that is associated with the second application for purposes of maintaining a balance, reading a value of the second application balance, and causing the value of the second application balance to be entered (e.g., by writing) into a memory space associated with the first application and containing a prior value of the first application balance. In step 512, setting of the second application balance equal to the first application balance can be accomplished by the first application accessing a memory space associated with the second application for purposes of maintaining a balance, and causing the new value of the first application balance to be stored there, for example, by overwriting the prior value of the second application balance.

Optionally, method 500 can include a step 516 of facilitating preventing of loading of value onto the second stored value application in cases other than a refund. This will be discussed further below in connection with FIG. 7.

By way of example and not limitation, the second application can be a legacy application and the first application can be a new application, for example, one that has at least some enhanced capabilities with respect to the second application, such as in the area of security. The second application could have a more stringent transaction time requirement than the first application. The applications can reside on a payment device of the kind described above. Limiting synchronization to transactions with the first application can be beneficial where the second application has strict transaction time requirements. Limiting loading of new value to transactions with the first application can be beneficial where the first application has enhanced security capability. However, in such cases, there may still be occasions when the balance of the second application increases; for example, in a transport system of the kind where the second application balance is reduced by an excess amount upon entry and a partial refund is given upon exit. In some embodiments of the invention, the second application balance at the time of a given transaction by the first application is constrained to be no greater than the second application balance at the time of the immediately previous transaction by the first application (to clarify, "immediately previous" in this context means the last transaction that occurred by the first application, not the necessarily the last transaction in general). In the transportation system example, using the second application upon entrance and exit, the second application balance can be so constrained by forbidding transactions by the first application between entering and exiting the transportation system.

Application selection is the process by which, for example, the terminal and/or reader (under control, e.g., of terminal or reader software or logic) issues a command to the payment device, which has the effect of activating a particular software application on the device. Such selection can be explicit, where the device activates an application specified by the terminal, or implicit, where the terminal need not specify a particular application for the particular application to be activated. In one or more embodiments of the invention, the synchronizing can be conducted in response to explicit selection of the first application by a terminal in communication with the payment device (synchronizing conducted in response to implicit selection of the first application is also possible).

In view of the foregoing discussion, it will be appreciated that a portable payment device in accordance with one aspect of the present invention can include a body portion, a memory associated with the body portion, and at least one processor associated with the body portion and coupled to the memory. The memory can contain a first stored value application having a first application balance and a second stored value application having a second application balance. The processor can be operative to perform one or more of the method steps described herein. The memory can have a first region associated with the first application and a second region associated with the second application. The second region can contain the second application balance, and the first application can have read and write access to the second application balance. For security, the second application may not have access to the data of the first application.

It will also be appreciated that a terminal apparatus for interacting with a portable payment device of the kind described herein can include a reader module; a memory associated with the reader module; and at least one processor coupled to the memory. The processor can be operative to perform one or more of the method steps described herein, for example, explicitly selecting the first application. While it is believed preferable that techniques of the present invention are implemented entirely or primarily on a card or other payment device, it should be understood that method steps and actions described herein can be performed by a payment device, a terminal, or a combination of the foregoing.

Exemplary techniques of the present invention can be thought of as the application of three rules: one for synchronization, one for increasing the balance, and one for decreasing the balance. Synchronization, under the exemplary rules, is limited to cases when the first, or new, application is invoked, for example, via the aforementioned selection process, using a contact or contactless interface. Synchronization upon activation of the second (legacy) application is avoided where such application has strict timing requirements. For example, a legacy public transport application might have a 200 ms transaction time limit, while a new, more secure application might have a 500 ms limit.

Figure 6:
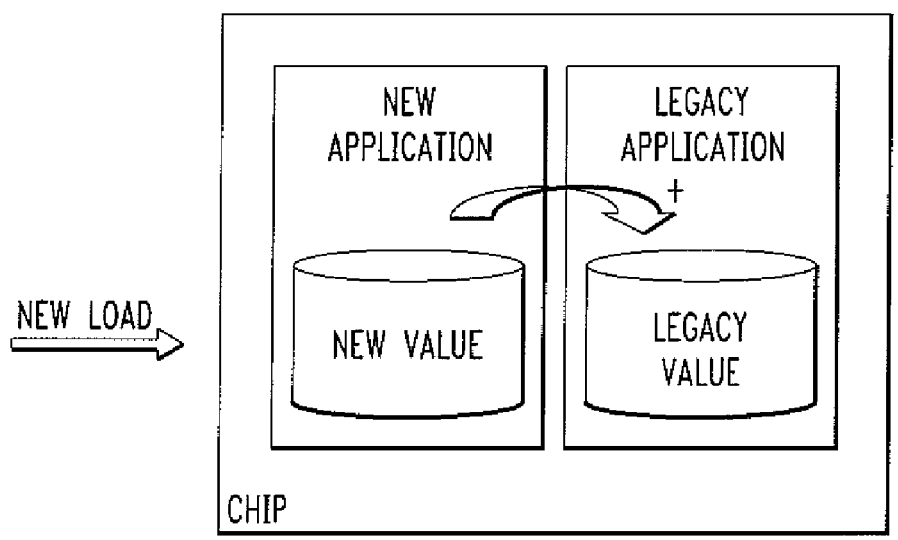
FIG. 6 shows loading of value on a payment device in accordance with certain techniques of the present invention.
Figure 7:
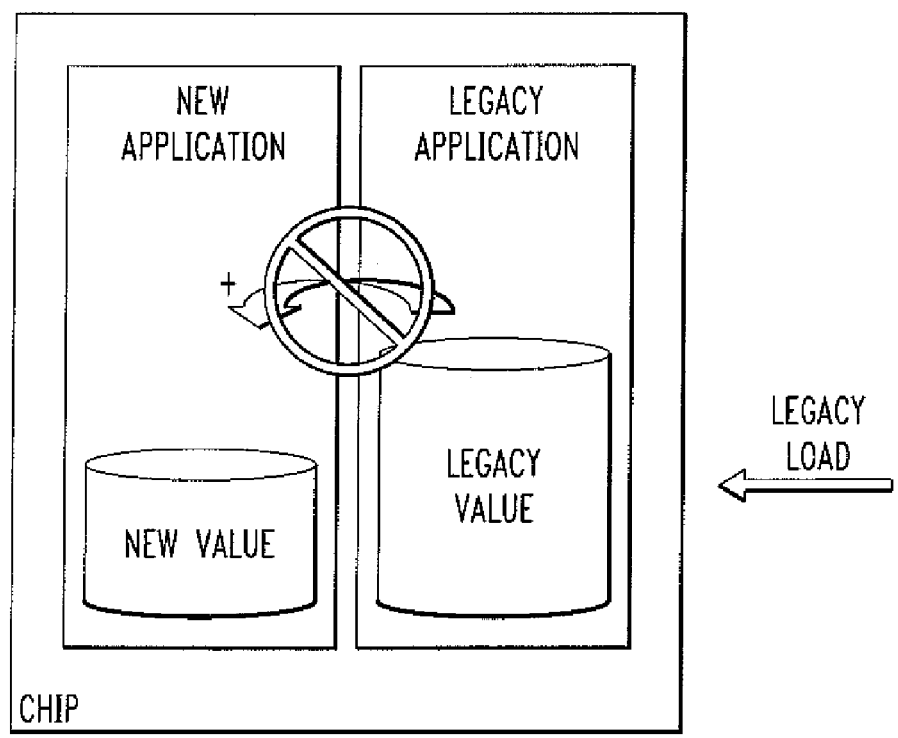
FIG. 7 illustrates the prevention of loading of value on a legacy payment application.

Under the exemplary rule, the new application only increases its balance as part of new application processing, for example, a value load on the new application, as depicted in FIG. 6, but not through synchronization with the legacy application, as shown in FIG. 7. The legacy application only increases the legacy balance via synchronization with the new application, or as part of legacy processing (e.g., the aforementioned partial refund upon exit from a transit system). Thus, under the exemplary rules, the new application balance can only be increased under the new application security requirements, and balance increases resulting from the loading of new value onto the card or device (as opposed to refund) should be managed by the new application. Loading of new value via the legacy application is not supported under the exemplary rules.

Figure 8:
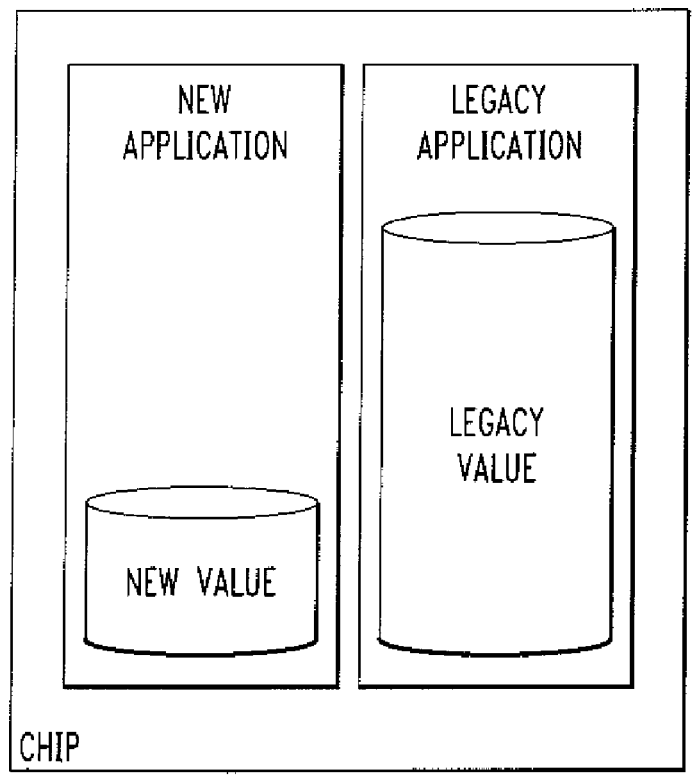
FIG. 8 illustrates a case where a balance of a legacy application is higher than that of a new application.
Figure 9:
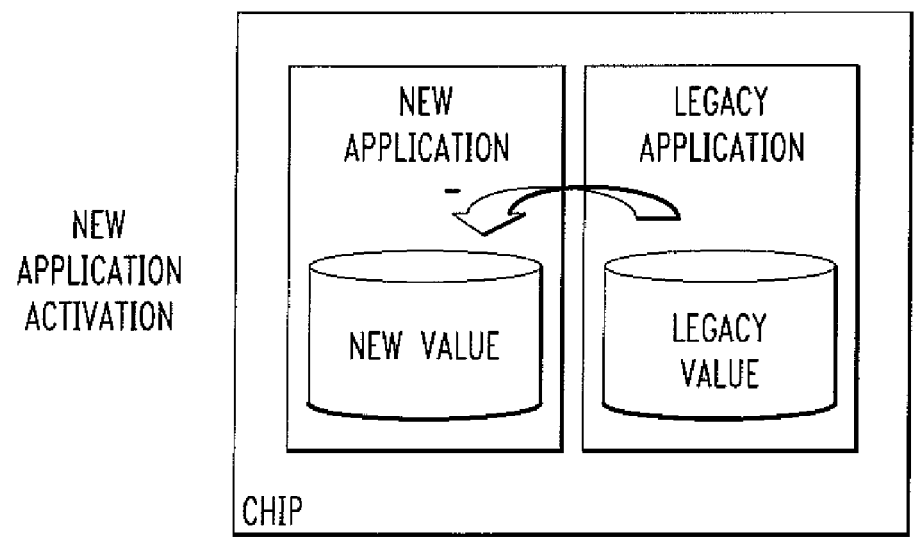
FIG. 9 illustrates a case where a balance of a legacy application is reduced to that of a new application upon activation of the new application.
Figure 10:
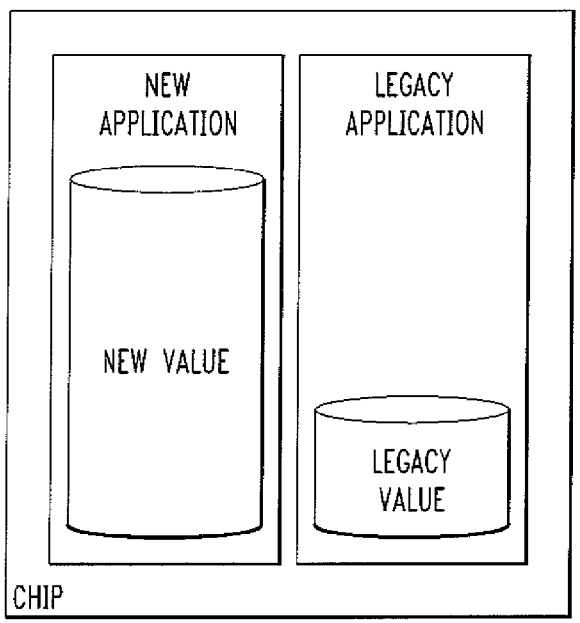
FIG. 10 illustrates a case where a balance of a new application is greater than that of a legacy application prior to activation of the new application.
Figure 11:
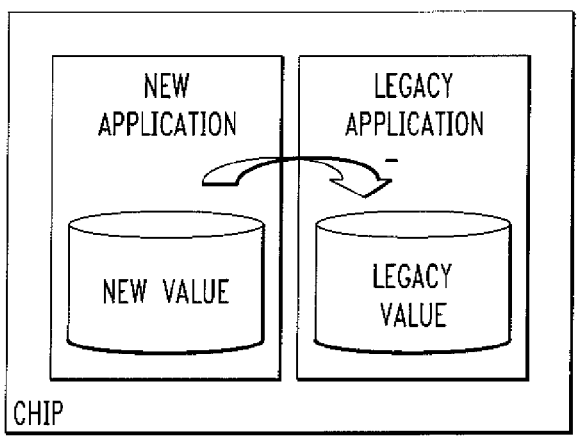
FIG. 11 illustrates a case where a balance of a new application is reduced to that of a legacy application upon activation of the new application.

Still considering the exemplary rules, at synchronization, the application with the highest balance has its balance reduced to match that of the other application. Thus, the terminal and the customer are presented with a consistent view of the balance, independent of the technology. If the new application's balance is less than the legacy balance, as shown in FIG. 8, the balance of the legacy application is reduced to that of the new application, as shown in FIG. 9. If the balance of the legacy application is less than the balance of the new application, as shown in FIG. 10, the balance of the new application is reduced to the level of the balance of the legacy application, as shown in FIG. 11. It will be appreciated that FIGS. 8 and 10 depict conditions prior to activation of the new application (with associated synchronization), while FIGS. 9 and 11 depict corresponding situations after activation of the new application, with the associated synchronization. Note that the situation depicted in FIG. 8 is unlikely to occur where there is automatic synchronization whenever a new application transaction occurs.

By way of summary, the legacy balance should not exceed the new balance, except under certain limited circumstances to be discussed shortly. The new balance can exceed the legacy balance following one or more legacy transactions and prior to the next new application transaction. At all other times, the two balances should be equal. Regarding the limited circumstances mentioned abode, a more precise statement is as follows: the second (legacy) application balance at the time of a given transaction by the first (new) application is constrained to be no greater than the second (legacy) application balance at the time of an immediately previous transaction by the first (new) application. This can be of significance, for example, in the case of certain transport systems as discussed above. As required for some transport systems, it is acceptable for the legacy balance to be repeatedly debited and refunded (in whole or in part) as long as the final legacy balance does not exceed the starting balance and as long as there is no intervening new application transaction. If, on a subsequent new application transaction, the legacy balance were found to exceed the new application balance then the legacy balance would be adjusted down to match the new application balance and an exception report would be generated detailing the adjustment. It follows that, if a legacy debit takes place on entry to the transport system and a (partial) legacy refund on exit from the transport system, then no new application transaction can be allowed within the perimeter of the transport system. Purchases (such as vending) taking place within the transport system must be by legacy payment.

It should be emphasized that techniques of the present invention are not limited to transition of a system from a legacy to a new application, but can be applied, e.g., wherever two or more payments applications with balances need to be managed and synchronized to mimic a single common balance, and the two (or more) applications could be maintained side-by-side indefinitely. Further, while examples have been given of offline balances on cards, e.g., techniques of the invention are applicable to any stored balance application(s) and are not limited to offline-only solutions. Yet further, while examples pertaining to transport systems have been given, the techniques of the invention can be used in other situations, e.g., proprietary or "closed" electronic purse programs.

Examples of potential legacy applications are the Philips MIFARE® application (information available at http://www.mifare.net/) and the Sony FELICA® application. One example of a potential new application is the ONESMART® Pre-Authorized application combined with the ONESMART PAYPASS® application, also known as PAYPASS M/CHIP®, promulgated by MasterCard International Incorporated.

The ONESMART® Pre-Authorized application is typically:
    ISO 7816 compliant (ISO specification for smart cards with a contact interface)
    EMV compliant (open specifications for globally interoperable smart card payments managed by EMVCo, LLC)
    The application can also be M/CHIP® compliant—M/CHIP® is the trademark of a published specification for an EMV-compliant card application (currently at version 4) promulgated by MasterCard International Incorporated
    The ONESMART® Pre-Authorized personalization profile of the M/CHIP® card application allows the card to transact without the risk of overdraft and is combined with some infrastructure requirements such as a host system to manage the funding account/mechanism.

The ONESMART PAYPASS® application (also known as PAYPASS M/CHIP®) typically:
    is based on a dual-interface (contact & contactless) smart card chip platform
    behaves as defined above (under 'OneSmart Pre-Authorized is') in contact mode
    behaves as follows in contactless mode:
    is ISO 14443 compatible (ISO specification for smart cards with a contactless interface)
    is PAYPASS® compliant—PAYPASS® is a specification for payments over a contactless interface promulgated by MasterCard International Incorporated (documentation is available as described at: http://www.paypass.com—some portions are available under license. It is to be understood that the ONESMART® Pre-Authorized application combined with the ONESMART PAYPASS® application, also known as PAYPASS M/CHIP®, is but one example of a possible new application, and other new applications, conforming, for example, to public specifications mentioned herein, are possible)
    is EMV compatible—to the extent that ONESMART PAYPASS® systems implement EMV as much as is possible with the exceptions of the card to terminal physical/electrical interface (which is contactless rather than contact) and curtailment of the EMV transaction flow in certain circumstances (e.g. for transactions which go online for authorization) to ensure a contactless 'tap & go' experience
    is compatible with the M/CHIP® application—the 'contactless EMV' transaction has been implemented based on a slightly modified version of the M/CHIP® application (these modifications are defined in the PAYPASS® specifications)

Figure 12:
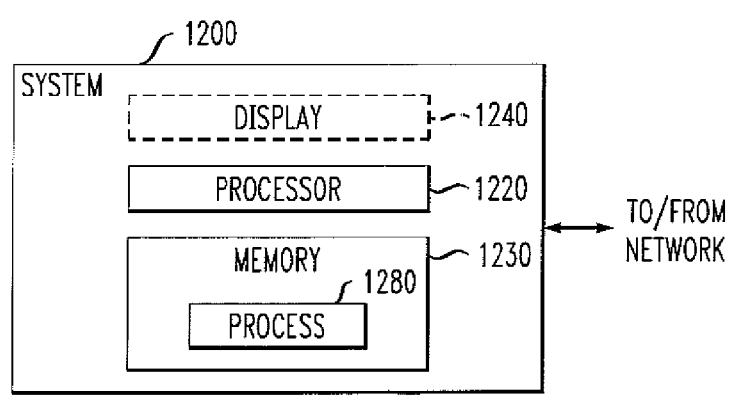
FIG. 12 is a block diagram of an exemplary computer system useful in one or more embodiments of the present invention.

By way of additional illustration, and not limitation, one typical sequence of transactions could be as follows:
 1. Card is 'topped-up' (e.g. at ATM or 'Value Load Kiosk')—new application balance top-up is performed and legacy balance is synchronized to new 'topped-up' value
 2. Card is used in retail environment (e.g. in store) for new application payment—new application balance is debited and legacy balance is synchronized to resulting value
 3. Card is used in transport environment (e.g. at ticket barrier or turnstile) for legacy transaction—legacy balance is debited but no synchronization takes place
 4. Card is used in retail environment (e.g. in a store) for new application transaction—new application balance is synchronized with legacy balance first, is then debited and legacy balance synchronized to resulting value The invention can employ hardware and/or software aspects. Software includes but is not limited to firmware, resident software, microcode, etc. Software might be employed, for example, in connection with a terminal 122, 124, 126, 134. Firmware might be employed, for example, in connection with payment devices such as cards 102, 112. FIG. 12 is a block diagram of a system 1200 that can implement part or all of one or more aspects or processes of the present invention. As shown in FIG. 12, memory 1230 configures the processor 1220 (which could correspond, e.g., to processor portions 106, 116) to implement one or more aspects of the methods, steps, and functions disclosed herein (collectively, shown as process 1280 in FIG. 12). The memory 1230 could be distributed or local and the processor 1220 could be distributed or singular. The memory 1230 could be implemented as an electrical, magnetic or optical memory, or any combination of these or other types of storage devices (including memory portions as described above with respect to cards 102, 112). It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on elements 102, 112, 142, 122, 124, 126, 134, 140, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 126, 134 or payment devices such as cards 102, 112 can make use of computer technology with appropriate instructions to implement method steps described herein. By way of further example, a terminal apparatus 122, 124, 126, 134 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of electronically managing a first stored value application having a first application balance and a second stored value application having a second application balance, said first stored value application and said second stored value application being associated with a portable payment device comprising a body portion, a memory associated with said body portion, and at least one processor associated with said body portion and coupled to said memory, said method comprising the steps of:

facilitating electronically conducting a first transaction by said first stored value application by using said at least one processor of said portable payment device, said first stored value application and said first application balance residing on said portable payment device within said memory of said portable payment device; and electronically synchronizing said second stored value application with said first stored value application by using said at least one processor of said portable payment device, said synchronizing being substantially contemporaneous with said first transaction, said second stored value application and said second application balance also residing on said portable payment device within said memory of said portable payment device, said synchronizing comprising communication between said first stored value application and said second stored value application via said payment device.

2. The method of claim 1, further comprising the additional step of facilitating conducting a second transaction by said second stored value application, said second transaction being conducted substantially without contemporaneous synchronization between said first and second stored value applications.

3. The method of claim 2, wherein said synchronizing step in turn comprises:

prior to said first transaction, setting said first application balance equal to said second application balance, in case said second application balance has been reduced due to a transaction conducted by said second application; and subsequent to said first transaction, setting said second application balance equal to said first application balance, to reflect in said second application balance one of an increase and a reduction in said first application balance caused by said conducting of said first transaction by said first application.

4. The method of claim 3, wherein said setting of said second application balance equal to said first application balance is accomplished by said first application accessing a memory space, within said memory of said portable payment device, associated with said second application for purposes of maintaining said second application balance and causing a prior value of said second application balance to be changed to said first application balance.

5. The method of claim 3, wherein said setting of said first application balance equal to said second application balance is accomplished by said first application accessing a memory space, within said memory of said portable payment device, associated with said second application for purposes of maintaining said second application balance, reading a value of said second application balance, and causing a memory space, within said memory of said portable payment device, associated with said first application for purposes of maintaining said first application balance, and containing a prior value of said first application balance, to be updated to take on said value of said second application balance.

6. The method of claim 2, wherein said second application balance at the time of a given transaction by said first application is constrained to be no greater than said second application balance at the time of an immediately previous transaction by said first application.

7. The method of claim 6, wherein said method is carried out in connection with access to a transportation system using said second application upon entrance and exit therefrom, and said second application balance is so constrained by forbidding transactions by said first application between entering and exiting said transportation system.

8. The method of claim 2, wherein said second application has a more stringent transaction time requirement than said first application.

9. The method of claim 1, wherein said synchronizing step is conducted automatically in association with said step of facilitating conducting of said first transaction.

10. The method of claim 9, wherein:
said synchronizing is conducted in response to explicit selection of said first application by a terminal in communication with said payment device.

11. The method of claim 9, wherein:
said synchronizing is conducted in response to implicit selection of said first application.

12. The method of claim 1, further comprising the additional step of facilitating preventing of loading of value onto said second stored value application in cases other than a refund.

13. The method of claim 1, wherein said second application is a legacy application and said first application has at least some enhanced capabilities as compared to said second application.

14. The method of claim 1, wherein said first transaction is a load transaction.

15. The method of claim 1, wherein said first transaction is a payment transaction.

16. A portable payment device comprising:
a body portion;
a memory associated with said body portion and containing a first stored value application having a first application balance and a second stored value application having a second application balance; and
at least one processor associated with said body portion and coupled to said memory, said processor being operative to:
facilitate conducting a first transaction by said first stored value application; and
synchronize said second stored value application with said first stored value application, said synchronizing being substantially contemporaneous with said first transaction, said synchronizing being carried out on said portable payment device.

17. The payment device of claim 16, wherein said processor is further operative to facilitate conducting a second transaction by said second stored value application, said second transaction being conducted substantially without contemporaneous synchronization between said first and second stored value applications.

18. The payment device of claim 17, wherein said processor is operative to synchronize said applications by:
prior to said first transaction, setting said first application balance equal to said second application balance, in case said second application balance has been reduced due to a transaction conducted by said second application; and
subsequent to said first transaction, setting said second application balance equal to said first application balance, to reflect in said second application balance one of an increase and a reduction in said first application balance caused by said conducting of said first transaction by said first application.

19. The payment device of claim 16, wherein said memory has a first region associated with said first application for purposes of maintaining said first application balance and a second region associated with said second application for purposes of maintaining said second application balance, said second region containing said second application balance, said first application having read and write access to said second application balance.

20. A terminal apparatus for interacting with a portable payment device having a first stored value application with a first application balance and a second stored value application with a second application balance, said terminal apparatus comprising:
a reader module;
a memory associated with said reader module; and
at least one processor coupled to said memory, said processor being operative to:
facilitate conducting a first transaction by said first stored value application; and
explicitly select said first application so as to trigger synchronization of said second stored value application with said first stored value application, said synchronization being substantially contemporaneous with said first transaction, said synchronization being carried out on said portable payment device in response to said explicit selection by said processor of said terminal apparatus.

21. The terminal apparatus of claim 20, wherein said processor is further operative to facilitate conducting a second transaction by said second stored value application, said second transaction being conducted substantially without contemporaneous synchronization between said first and second stored value applications.

* * * * *